Figure 1:
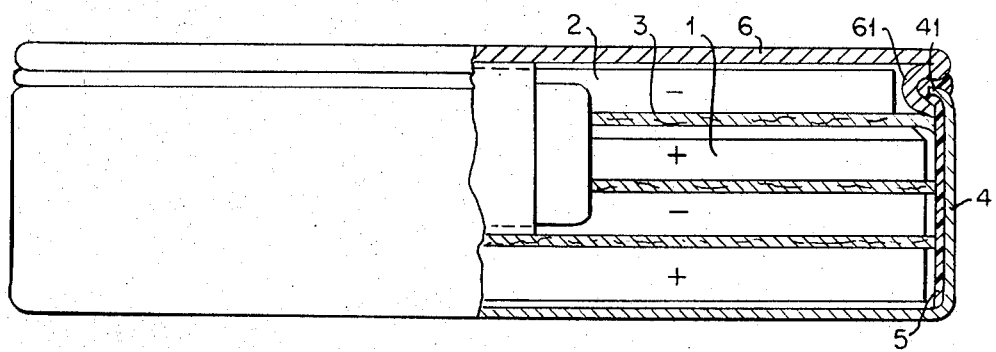

United States Patent [19]
Schenk et al.

[11] 3,785,874
[45] Jan. 15, 1974

[54] GAS-TIGHTLY CLOSED GALVANIC ELEMENT

[75] Inventors: Gerd Schenk, Iserlohn; Werner Durhack, Hagen, both of Germany

[73] Assignee: Varta Aktiengesellschaft, Frankfurt am Main, Germany

[22] Filed: Feb. 28, 1972

[21] Appl. No.: 229,852

[30] Foreign Application Priority Data
Mar. 4, 1971 Germany............................ 7108128

[52] U.S. Cl............... 136/133, 136/169, 220/46 R, 220/67
[51] Int. Cl. ........................................... H01m 1/02
[58] Field of Search................... 136/133, 169, 107, 136/111; 220/67, 46 R

[56] References Cited
UNITED STATES PATENTS
2,697,736  12/1954  Goldberg et al.................... 136/133
2,392,795  1/1946   Anthony et al..................... 136/133
2,971,999  2/1961   Jacquier........................... 136/111

FOREIGN PATENTS OR APPLICATIONS
560,164   9/1923   France............................. 136/169

Primary Examiner—Donald L. Walton
Attorney—Arthur E. Wilfond et al.

[57] ABSTRACT

Gas-tightly closed galvanic element includes a cell container formed of a cup having an upper radially inwardly directed flanged edge, a cover for the cell container formed with a radially inwardly directed indentation, the flanged edge of the cup being pressed into the indentation formed in the cover, and a sealing ring interposed therebetween.

2 Claims, 2 Drawing Figures

GAS-TIGHTLY CLOSED GALVANIC ELEMENT

The invention relates to a gas-tightly closed galvanic element and, more particularly, to a gas-tight accumulator or storage battery.

It has been known heretofore to employ deep-drawn cylindrical cups closed with a cover for gas-tight accumulators or storage batteries. The cover and cup-housing are fabricated of electrically conductive material, are at varying potential and are separated from one another by a suitable insulation which serves simultaneously as a seal.

In the heretofore known types of clusures for button-cells, due to the construction thereof, one more-or-less large circular ring is required for the closure. The interior volume of the cells as compared to the total volume thereof is thereby about 28 to 33 percent smaller.

It is accordingly an object of the invention to provide a cell closure that allows for an optimum inner volume and is relatively simple and economical to manufacture. It is, moreover, another object of the invention to provide such a gas-tight clusure of a cell that no electrolyte or gas will escape therefrom even when there is a varying internal pressure therein.

With the foregoing and other objects in view, there is provided in accordance with the invention gas-tightly closed galvanic element comprising a cell container formed of a cup having an upper radially inwardly directed flanged edge, a cover for the cell container formed with a radially inwardly directed indentation, the flanged edge of the cup being pressed into the indentation formed in the cover, and a sealing ring interposed therebetween.

Other features which are considered as characteristic for the invention are set forth in the appended claims.

Although the invention is illustrated and described herein as gas-tightly closed galvanic element, it is nevertheless not intended to be limited to the details shown, since various modifications and structural changes may be made therein without departing from the spirit of the invention and within the scope and range of equivalents of the claims.

Figure 2:
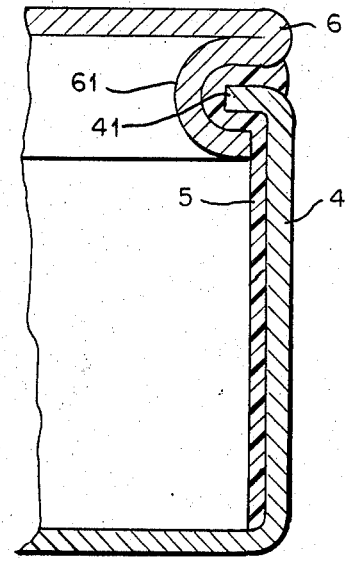

The construction and method of operation of the invention, however, together with additional objects and advantages thereof will be best understood from the following description of specific embodiments when read in connection with the accompanying drawings, in which:

FIG. 1 is an elevational view, partly in section of an accumulator or storage battery constructed in accordance with the invention; and FIG. 2 is a fragmentary enlarged view of FIG. 1 showing the closed cell thereof.

Referring now to the drawing, there are shown a pair of electrode sets, respectively formed of a positive and a negative electrode 1 and 2 separated by a suitable conventional separator 3, received in a cup 4. As can be seen in FIG. 1, the electrode set 1, 2, 3 extends upwardly beyond a radially inwardly extending flanged edge 41 of the cup 4. Of course only one electrode set or more than two sets may be provided, in accordance with the invention, in the cup 4. An insulating ring 5 constructed so that it serves simultaneously as a sealing ring and as an insulator for the wall of the cup 4 is provided in the cup. The insulation ring 5 is supported on the base of the cup 4. A cover 6 for the cup 4 is connected to a polarity of the plate set of the accumulator or storage battery and is disposed on the cup 4. The cover 6 is formed with a radially inwardly extending indentation 61, and the radially inwardly extending flanged edge 41 of the cup 4 firmly clutches or engages in the indentation 61. The wall of the cup thus terminates substantially in a straight line with the edge of the cover 6. In this way, forces occurring in axial direction of the accumulator or storage battery can be absorbed without stressing the seal 5 which acts also in horizontal direction as is apparent from the figures.

In a gas-tight accumulator or storage battery constructed in accordance with the invention, the required volume for the closure thereof is still only about 20 percent of the total volume, i.e., the volume of the electrodes can be increased by about 38 percent.

We claim:

1. Gas-tightly closed galvanic element comprising a cell container formed of a cup having an upper radially inwardly directed flanged edge, a cover for the cell container formed with a radially inwardly directed indentation, said flanged edge of said cup being pressed into said indentation formed in said cover, and a sealing ring interposed therebetween, said cup having a wall terminating in a straight line with the edge of said cover, said sealing ring having a cylindrical extension disposed adjacent the inner surface of the wall of said cup and supported on the base of said cup, said sealing ring serving as insulator for said wall of said cup and having a peripheral marginal edge located between and in alignment with the wall of said cup and the edge of said cover.

2. Gas-tightly closed galvanic element according to claim 1 including at least one electrode set received in said cup and extending upwardly beyond said edge thereof.

* * * * *

PO-1050
(5/69)

UNITED STATES PATENT OFFICE
CERTIFICATE OF CORRECTION

Patent No. 3,785,874                    Dated January 15, 1974

Inventor(s) GERD SCHENK AND WERNER DURHACK

It is certified that error appears in the above-identified patent and that said Letters Patent are hereby corrected as shown below:

In the heading to the printed specification, line 10

"May 4, 1971    Germany........7109128"    should read

--May 4, 1971    Germany........G 71 08 128.2--

Signed and sealed this 9th day of July 1974.

(SEAL)
Attest:

McCOY M. GIBSON, JR.                C. MARSHALL DANN
Attesting Officer                   Commissioner of Patents